Sept. 19, 1967      E. R. EVANS      3,342,234

SELF-LOCKING SCREW

Filed Feb. 9, 1966      2 Sheets-Sheet 1

INVENTOR.
EDWIN R. EVANS DECD.
BY THE DETROIT BANK AND
TRUST COMPANY EXECUTOR

Whittemore, Hulbert & Belknap
ATTORNEYS

Sept. 19, 1967  E. R. EVANS  3,342,234
SELF-LOCKING SCREW
Filed Feb. 9, 1966  2 Sheets-Sheet 2

INVENTOR.
EDWIN R. EVANS DECD.
BY THE DETROIT BANK AND TRUST
COMPANY EXECUTOR

ATTORNEYS

United States Patent Office 3,342,234
Patented Sept. 19, 1967

3,342,234
SELF-LOCKING SCREW
Edwin R. Evans, deceased, late of Orchard Lake, Mich., by The Detroit Bank and Trust Co., executor, Detroit, Mich., a corporation of Michigan, assignor to Lock Thread Corporation, Detroit, Mich., a corporation of Delaware
Filed Feb. 9, 1966, Ser. No. 531,653
10 Claims. (Cl. 151—22)

This application is a continuation-in-part of the application Ser. No. 227,301, filed Oct. 1, 1962, now Patent No. 3,247,877. The invention relates to screws generally and refers more particularly to screws designed to have a thread locking interference fit with a mating internally threaded member.

It is an essential object of this invention to provide an improved self-locking screw adapted to have a minor diameter crest-root interference with a mating threaded member.

Another object is to provide a self-locking screw having a continuous thread including a locking body portion and a ramp portion, the root of the body portion of the thread being adapted to have an interfering fit with the crest of a mating female member, and the root of the ramp portion of the thread being relieved and adapted to swage the crest of the female member upon entry of the screw. In a screw of this type designed for minor crest-root interference, it is the ramp root which does most of the work in swaging the female crest upon entry of the screw. It has been found that the entry torque may be reduced if the ramp root is relieved.

Another object is to provide an improved self-locking screw having a continuous thread including a body portion, a starting portion and a ramp portion connecting the body portion and starting portion, the root of the starting portion being of smaller diameter than the root of the body portion, and the root of the ramp portion being relieved and of increasing diameter from the starting portion to the body portion.

Another object is to provide an improved self-locking screw having substantially full-formed threads in the starting and ramp portions thereof. Such a construction eliminates the tendency of the starting threads to cross-thread or jam on and distort the crest of the internal thread upon entry into a pre-tapped hole.

Another object is to provide an improved self-locking screw having a ramp root provided with uniformly, circumferentially spaced relieved portions located closer to the screw axis than the intervening portions.

Another object is to provide a self-locking screw wherein the root of the body portion of the thread has uniformly circumferentially spaced relieved portions located closer to the screw axis than the intervening portions.

Another object is to provide a self-locking chipless, self-tapping screw having a root designed to have a relieved interference with the crest of the thread formed upon entry of the screw in a drilled hole, and a tapered starting thread to facilitate the entry into a drilled hole.

Another object is to provide a self-locking, self-tapping screw in which the root of the starting thread portion may be either of substantially the same diameter as of of less diameter than the root of the body portion of the thread.

Another object is to provide a self-locking screw having improved sealing characteristics.

Another object is to provide a self-locking screw having superior shear strength.

Another object is to provide a self-locking screw requiring less torque for assembly and having less variation in assembly characteristics.

Another object is to provide a self-locking screw having improved lubricating characteristics and lower galling characteristics.

Other objects and features of the invention will become apparent as the description proceeds, especially when taken in conjunction with the accompanying drawings, wherein.

Figure 1:
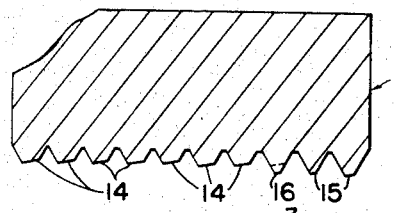
FIGURE 1 is a sectional view of a thread rolling die taken perpendicular to the ribs which may be employed with another similar die to form a screw in accordance with the present invention.
Figure 6:
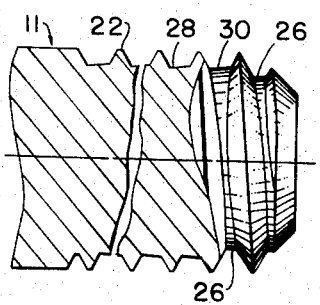
FIGURE 6 is a side elevational view, partly in section, of a screw formed by thread rolling one of the blanks shown in the FIGURES 2 and 4.

Referring now more particularly to the drawings, a self-locking screw of this invention is illustrated in FIGURE 6 and generally designated 11. This screw may be made by rolling the blank 12 in FIGURE 2 between a pair of complementary thread rolling dies, one of which is indicated in FIGURE 1 at 13.

The thread rolling die 13 has straight spaced parallel ribs 14, straight spaced parallel ribs 15 which are higher, that is, project to a greater extent than the ribs 14, and the tapered rib 16 constituting a ramp having a thread height at one end equal to that of the ribs 14 and at the other end equal to that of ribs 15. The die shown in FIG- URE 1 is one of a pair. A similarly formed matching die is used in cooperation with die 13 in a thread rolling operation to produce the screw 11 in FIGURE 6 from the blank 12 in FIGURE 2.

Figure 2:
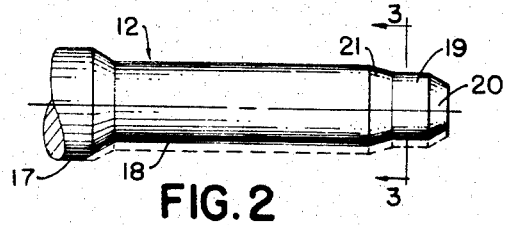
FIGURE 2 is a side elevational view of a blank from which a screw of this invention may be formed by thread rolling.

The blank 12 in FIGURE 2 has a shank 17 not intended to be threaded, a locking body portion 18, and a starting portion 19. The starting portion 19 is adjacent the entering end of the blank and has a conical or chamfered tip 20. The starting portion 19 is connected to the body portion 18 by a conical ramp portion 21. The body portion 18 of the blank is of lobular cylindrical form. In other words, the longitudinal surface elements of the body portion are parallel to the axis of the blank but in cross section the body portion is polygonal or lobular rather than circular. However, the blank is preferably so formed that the distance across the body portion measured through the longitudinal central axis of the blank is the same at every angle. Preferably the lobes of the body portion (that is the points on the surface where the three radiating lines intersect the surface, which points are spaced a maximum distance from the center of the blank) are three in number although other numbers of lobes may be employed. In general, it is preferred that there be an odd number of lobes.

The starting portion 19 is of smaller cross section than the body portion but it too, is of cylindrical lobular form having the same number of lobes as the body portion and being such that the distance across the starting portion measured through the longitudinal central axis of the screw, is the same at every angle. As explained hereinafter, the starting portion need not be lobular.

The shank 17 is of circular cylindrical form concentric with the starting and body portions.

The conical portions 20 and 21 are likewise lobular having the same number of lobes as the body and starting portions, and being likewise of equal cross dimension measured through the longitudinal central axis of the blank at every angle.

The longitudinal central axis of the blank is at the center of the circle within which the outline of the body portion is inscribed (which is coincident with the center of the concentric circle within which the outline of the starting portion is inscribed).

While the body portion 18 is shown as being considerably longer than the starting portion, it will be understood that the starting portion may if desired be the longer of the two.

In FIGURE 2 the dotted line represents the amount of relief provided between the lobes, that is, the difference between the radius of the blank at the lobes and at points midway between the lobes.

When the blank in FIGURE 2 is rolled between a pair of thread dies, one of which is shown in FIGURE 1, the screw 11 shown in FIGURE 6 is produced. The thread die ribs 14 roll the body portion of the thread on the body portion 18 of the blank, the ribs 15 roll the starting portion of the thread on the starting portion 19 of the blank, and the rib 16 rolls the ramp portion of the thread on the conical ramp portion 21 of the blank to connect the starting and body portions of the thread on the finished screw.

Figure 8:
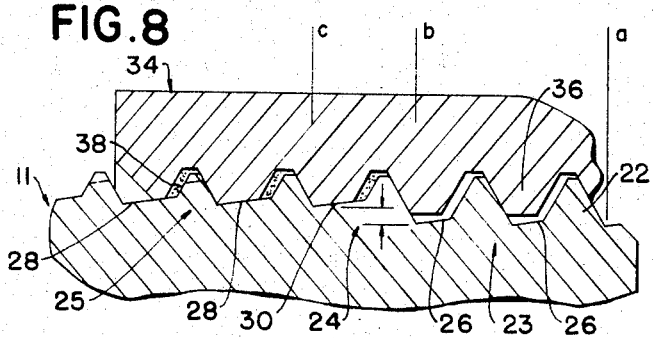
FIGURE 8 is a fragmentary sectional view showing the threaded relationship of the screw in FIGURE 6 in a pre-tapped hole, taken at a high point or lobe of the screw thread.
Figure 7:
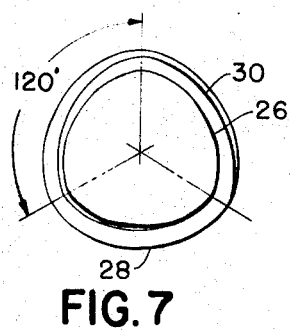
FIGURE 7 is a diagrammatic view illustrating a portion of the thread root form of the screw in FIGURE 6.

The thread on the screw in FIGURES 6–8 is a continuous male thread 22 having tapered flanks. The thread also has a starting portion indicated at 23 between lines $a$ and $b$ in FIGURE 8, a ramp portion 24 between lines $b$ and $c$, and a body portion 25 to the left of line $c$. The starting thread will ordinarily constitute one or more convolutions or turns of the thread, the ramp thread will preferably extend from one-third to one full convolution and in the present instance, is one full convolution, and the major portion of the blank covered by the main body thread 25 is usually made up of several convolutions (actually it can if desired be very short).

The root of the starting thread portion is indicated at 26 and may be lobular as shown in FIGURES 7 and 8.

FIGURE 7 provides an outline of the axial projection of the starting thread root and it will be seen to be of the same general lobular outline as the starting portion 19 of the blank. The distance across the axial projection measured through the center of the screw (the center being coincident with the center of the circle within which the axial projection is inscribed) is the same at every angle.

The root of the locking body portion of the thread is shown at 28 and will be seen in axial projection likewise to have the same general lobular outline as the body portion 18 of the blank, the distance across the axial projection measured through the center of the screw being the same at every angle.

The axial projection of the root of the single convolution constituting the ramp portion of the thread (that is, the portion from numeral 26 to numeral 30 in FIGURE 8, and the portion between lines $b$ and $c$ in FIGURE 10) also has a lobular configuration similar to that of the ramp portion of the blank. FIGURE 7 indicates how this ramp root connects the body portion and starting portion.

Figure 10:
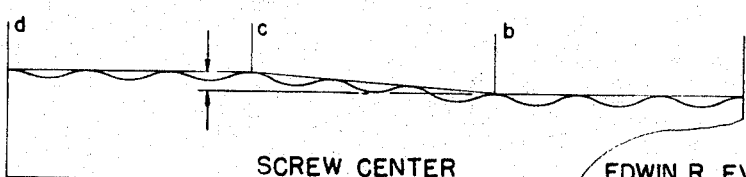
FIGURE 10 is a layout or linear projection illustrating the thread root contour of the screw in FIGURE 6, including the starting portion, ramp portion and body portion.

FIGURE 10 shows clearly the lobular or relieved form of the root between the lines $a–b$ (starting thread), $b–c$ (ramp), and $c–d$ (locking body portion).

FIGURE 8 shows the screw 11 threaded into a member 34 having a pre-tapped hole. The internal thread 36 is of uniform major and minor diameter throughout the length of the hole and is of the continuous helical form shown in the right two threads in FIGURE 8. The remaining threads to the left have been swaged by the insertion of the screw. As seen in FIGURE 8, the entire root of the screw is preferably tapered at 6°, and the starting thread portion is of smaller diameter than the crest of the female thread. It will be understood that the screw thread starting root 26 is shown in FIGURE 8 at the lobes or high points, and that there will be even greater clearance with the female crest at the reliefs or shallow portions of the starting thread. It should be understood that in a broad sense, the starting portion of the screw thread root does not have to be lobular since it does not interfere with the female crest.

The body portion of the screw in FIGURE 8, (the portion to the left of the line $c$ in FIGURE 8 and between lines $c–d$ in FIGURE 10) has a root of greater diameter than the starting thread portion, the root being indicated at 28. In FIGURE 8, the root 28 is shown at the lobes or high points and it will be noticed that they have an interfering engagement with the crests of the female thread and swage them as shown. The root of the screw is broad to have a wide load bearing engagement with the female crest where there is interference. Material displaced from the crest of the female thread by the swaging action is indicated at 38.

The root ramp of the screw 11, that is the portion of the root between lines $b$ and $c$, gradually increases in diameter from the starting to the main body portion of the thread, as viewed in FIGURE 7. Actually this root of the ramp has a lobular form as there indicated and also as shown in the diagram of FIGURE 10.

The root ramp of the screw, that is the portion thereof between the lines $b$ and $c$, does most of the work in swaging the female crest because this is the first part of the screw root to engage the female crest. The lobular form of the root ramp provides for easier driving of the screw because between the high points or lobes on the ramp, there will be relief in the interference and as a matter of fact at such intervening portions of the ramp root there will be actual voids between the ramp root and the female crest.

Figure 9:
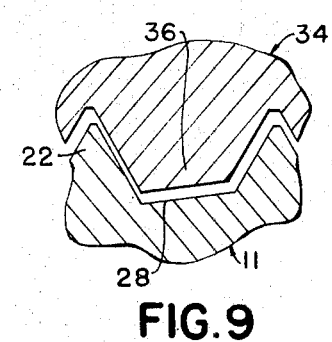
FIGURE 9 is a fragmentary sectional view showing the threaded relationship between the screw of FIGURE 6 and a pre-tapped hole, the section being taken at a land or low point of the screw thread in the body portion thereof. This view may also be considered as a section at a land or low point of the screw thread in the ramp portion thereof.

There is also relief in the interference between the screw and the female thread along the length of the body portion of the screw, that is the portion to the left of the line $c$ in FIGURE 8. This will be understood from FIGURE 9 which shows the engaging male and female threads at the relieved or low points in the body portion of the screw. Actual clearance is seen between the male root and female crest. FIGURE 9 may also be considered to illustrate the clearance provided at a low or relieved point in the root ramp between lobes.

It is desirable that at least one convolution of the root of the screw thread to the left of the line c in FIGURE 8, which is the first convolution in the body portion of the thread, be lobular as shown to provide the relieved interference. The remaining body portion thread roots may also be relieved as shown. However, in some instances these remaining convolutions of the main body portion of the screw thread after the first one may be unrelieved or round so as to have a continuous interference with the female crest. Somewhat higher torque may be involved in inserting such a screw, but better sealing and assembly strength are afforded. The increased torque is not too great because most of the work of swaging the crest of the female thread is done by the ramp root.

The screw threads in FIGURE 8 are substantially fullformed for the full length of the member. The thread crest has substantially the same lobular form as the root, the root being shown in linear projection in FIGURE 10, except that the crest is of the full diameter of the body portion of the thread throughout its length. At no point does the thread crest engage or interfere with the root of the pre-tapped hole. The dotted lines in the two threads at the left in FIGURE 8 indicate that some of the screw thread crests may be starved or somewhat less than fullformed without materially affecting the usefulness of the screw.

The convolutions of the thread of the screw 11 are fullformed throughout the ramp and starting portions of the thread in order to eliminate the possibility of cross-threading. Unless these threads near the entering end of the screw are full-formed, they tend to cross-thread or jam and distort on the female threads when the screw is inserted in a pre-tapped hole.

When the screw 11 is tightened, the 6° root of the screw wedges lockingly on the swaged crest of the female thread.

Figure 4:
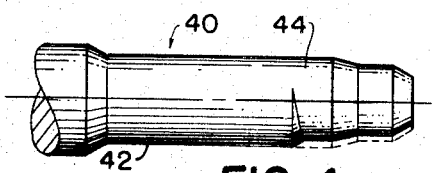
FIGURE 4 shows a modified blank.

FIGURE 4 illustrates a blank which is indicated at 40 and is the same as the blank 12 shown in FIGURE 2 except that the part 42 of the body portion is of uniform circular cross-section. Only the front part 44 of the body portion is lobular. Such a blank rolled in the same manner as blank 12 will produce a screw differing from the screw 11 in that some of the convolutions of the body portion of the thread, both in their crests and in their roots, will be circular rather than lobular. Otherwise, a screw formed from the blank of FIGURE 4 will be the same as one formed from the blank of FIGURE 2. The resulting screw would have the relieved interference at the root in the lobular body threads near the ramp, as described in connection with FIGURES 6 and 8, but the roots of the circular body threads would have continuous interference.

It is possible to employ a blank which is like the one in FIGURE 2, except that it is of circular cross-section throughout its length rather than lobular. In rolling such a blank, special dies may be employed having straight ribs to form the locking body portion and starting portion of the screw thread, but having a specially contoured rib or ribs to roll the ramp portion. The result will be a screw thread of the type shown in the layout or projection of FIGURE 11 in which the thread is designated 46 and has the root 48. The body portion of the root 48 is 50, the ramp portion is 52 and the starting portion is 54. The body portion 50 of the root will be circular rather than lobular, but of larger diameter than the circular starting thread portion 54. Only the ramp portion and a fraction of the first body thread will have the relieved or lobular form shown in FIGURE 11. It will be noted that there is a relief 56 in the body portion of the root immediately beyond the high point or highest lobe 58 of the ramp. The highest lobe 58 of the root is no higher than the locking body portion 50.

The crest of the screw thread 46 is of substantially uniform diameter in the starting thread portion 60 and of the same substantially uniform diameter in the body portion 62. Because of the non-uniform displacement of metal between the dies where the ramp portion 52 is rolled, there will be undulations in the crest of the ramp portion 64, although the lobes in the crest will be opposite the reliefs in the root.

Figure 11:
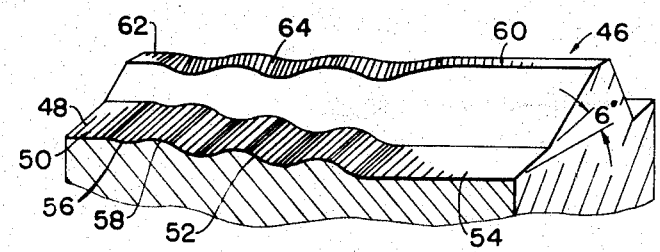
FIGURE 11 is a perspective view illustrating a development or layout of a portion of a screw thread which has been made on a stepped blank similar to the one shown in FIGURE 2, except that the blank is round and rolled against flat dies in which relief has been machined.
Figure 12:
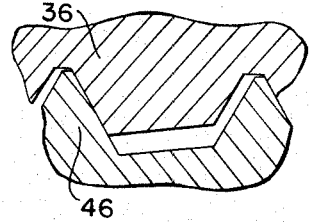
FIGURE 12 is a sectional view of a screw having the thread form shown in FIGURE 11, the screw being shown in a pre-tapped hole and the section being taken near the high point of the ramp but in a low relief area.

The thread shown in FIGURE 11 will have an interfering engagement with the internal thread shown in FIGURE 8. There will be continuous interference on the root of the screw in the body portion thereof, though relieved at 56. The lobular root ramp 52 does most of the work to swage the female crest, with voids between the female crest and the low points of the root ramp. The root of the starting thread portion 54 does not engage the female thread crests. Such a screw when inserted has the same relation in cross-section to the female thread as the screw 11 seen in FIGURE 8. FIGURE 12 illustrates the threaded engagement between the screw of FIGURE 11 and the mating female thread taken in section through one of the low points or reliefs on either side of the lobe 58, showing the void between the screw root and the female crest.

Figure 13:
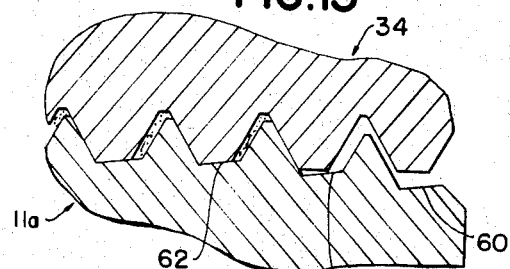
FIGURE 13 is similar to FIGURE 8 but shows a modified screw in a pre-tapped hole.
Figure 14:
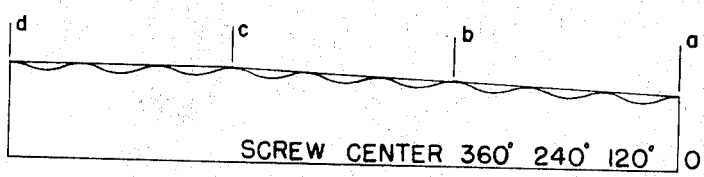
FIGURE 14 is a linear projection of the root form of the screw in FIGURE 13.

FIGURE 13 illustrates a modification of the screw of FIGURE 6. The screw in FIGURE 13 is designated 11a and is shown threaded into the female member 34. The screw 11a differs from the screw 11 primarily in the starting root contour which is shown in the development or axial projection of FIGURE 14. The root contour of the starting portion of the thread is shown between the lines a and c in FIGURE 14. The initial part between lines a and b extends from 60 to 61 in FIGURE 13. Thus it will be seen that in this initial portion of the thread the root is lobular and extends for approximately one full revolution. It will also be noted that the root in the thread portion between lines a and b is of a gradually increasing diameter as it leads into the portion of the thread shown between the lines b and c which includes the convolution from 61 to 62 in FIGURE 13. This portion of the root is also lobular and gradually increases in diameter at the same rate as the portion between lines a and b. The body or locking portion of the thread has the contour shown between the lines c and d which as noted is also lobular but is not of increasing diameter. Thus, the root between the lines a and c constitutes a continuous ramp-starting portion leading to the locking body portion.

The ramp portion of the root swages the female thread crest as will be apparent in FIGURE 13 to shape it to the 6° root angle of the screw thread. The relieved interference on the ramp and on the body portion of the screw root will cause the screw to be locked firmly in the tapped hole.

It will be understood that preferably the distance across the axial projection of the locking or body portion of the root measured at any angle through the center of the screw will be the same.

The crest of the thread has substantially the same lobular form as the root. The convolutions of the threads are substantially full-formed throughout the ramp and starting portion to prevent cross-threading.

Figure 15:
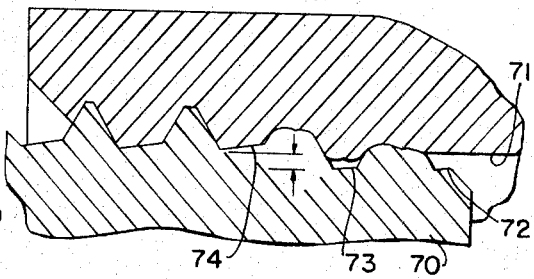
FIGURE 15 is a sectional view of a self-locking, chipless, self-tapping screw shown threaded into a drilled hole.

FIGURE 15 illustrates a self-locking, chipless, selftapping screw 70 partially screwed into a drilled hole 71. The contour of the starting portion of the root of screw 70 is shown between the lines a and b in FIGURE 16 and includes the convolution between the points 72 and 73 in FIGURE 15. The starting portion of the root is lobular as shown and the distance across the axial projection of the starting thread root measured at any angle through the center of the screw will be the same.

Figure 16:
FIGURE 16 is a linear projection of the root form of the screw in FIGURE 15.

The ramp portion of the root is the convolution between the points 73 and 74 in FIGURE 15 and is shown in the development of FIGURE 16 between the lines b and c. This portion of the root is also lobular although of gradually increasing diameter from its merging connection with the starting thread to its similar connection with the body of the thread.

The body or locking portion of the thread is from point 74 to the left in FIGURE 15 and between the lines c and d in FIGURE 16 and will be seen to be lobular. The distance across the axial projection of the root in the body portion of the thread is the same at any angle through the center of the screw.

The crests of the thread of the screw 70 have substantially the same lobular form as the root shown in FIGURE 16, although naturally of somewhat larger diameter. The diameter of the crest in the first few threads increases substantially at the same rate as the linear presentation shown in FIGURE 14 between lines a and c. The crest of the screw thread forms a complementary female thread in the drilled hole when the self-tapping screw enters, and the crest of the female thread moves into locking interference with the ramp root and body root of the screw thread.

Figure 17:
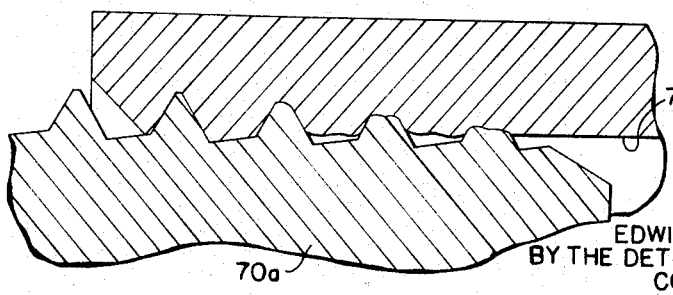
FIGURE 17 is similar to FIGURE 15 but shows a modified self-tapping screw.

FIGURE 17 shows a modification of the self-locking, chipless, self-tapping screw of FIGURE 15. The screw in FIGURE 17 is shown partially screwed into the drilled hole 71. This screw is indicated at 70a and differs from the screw 70 in that the root of the thread in the starting and ramp portions is the same in size and shape as the body or locking portion. The body or locking portion of screw 70a is the same as that of the screw 70, and hence has the lobular form shown between lines c and d in FIGURE 16. The body or locking portion of screw 70a is carried out to the entering end of the screw.

In all of the foregoing modifications, the general outline of the relieved root form described will preferably be generally as shown in FIGURE 7. While relieved, this root contour is at all points convex.

Figure 5:
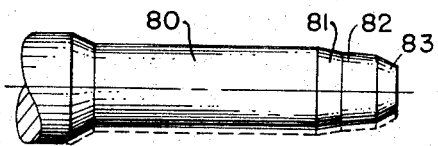
FIGURE 5 shows a blank from which the self-tapping screw in FIGURE 15 may be formed.
Figure 3:
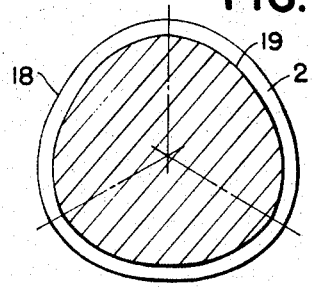
FIGURE 3 is a sectional view taken on the line 3—3 of FIGURE 2.

The screw 70 shown in FIGURE 15 may be made by thread rolling the blank shown in FIGURE 5. This blank has a relieved cylindrical locking body portion 80 which may have the same cross-sectional outline as the body portion 18 of the blank in FIGURE 2. The conical ramp portion 81 is also relieved and in cross-section has substantially the same form as the ramp portion 21 in FIGURE 2. The starting portion 82 of the blank in FIGURE 5 is conical, but of less angle than the portion 81, and similarly relieved. The starting portion 82 has the chamfered tip 83.

A self-locking screw may be formed from a blank on the order of the blank 40 in FIGURE 4 but modified so that only the starting portion is relieved. In other words, the ramp portion and entire locking body portion would be round or circular in cross-section. The screw that would be formed by thread rolling such a blank would have a relieved starting thread root and ramp root. The majority of the convolutions of the root in the locking body portion would be round.

What is claimed as the invention is:

1. A self-locking screw having a continuous external generally helical male thread including a starting portion adjacent one end of said screw, a body portion, and a ramp portion between said starting and body portions, said thread continuing throughout each of said portions, the root of said starting portion being of reduced cross-section relative to the root of said body portion, the root of said body portion in at least one convolution adjacent said ramp portion being of arcuate non-circular cross-section having a plurality of convex arcuately curved lobes and intermediate sides, said lobes being located farther outward from the axial center of said screw than said sides, said lobes and sides merging and blending gradually with one another to provide a substantially smooth, gently relieved form free of sharp edges and projections, the root of said ramp portion connecting the roots of said body portion and starting portion, said root of said ramp portion being of arcuate non-circular cross-section having a plurality of circumferentially spaced, convex arcuately curved lobes and intermediate sides, said second-mentioned lobes being located progressively farther outward from the axial center of said screw from said starting portion to said body portion to provide said root of said ramp portion with a generally radially outward taper from said starting portion to said body portion, said second-mentioned intermediate sides being radially inwardly relieved relative to the line of taper provided by said second-mentioned lobes, said second-mentioned lobes and sides merging and blending gradually with one another to provide a substantially smooth, gently relieved form free of sharp edges and projections, the root of said ramp portion being substantially symmetrical in cross-section with the root of said body portion in said one convolution thereof, said root being of substantial width measured axially to provide broad load-bearing surfaces, said thread in said starting portion being substantially full-formed and of substantial height to assure proper starting in a pre-tapped hole.

2. The screw defined in claim 1, wherein the root of said starting portion is of arcuate non-circular cross-section having convex arcuately curved lobes and intermediate sides, each of the lobes of said starting portion being located farther outward from the axial center of said screw than the intermediate sides thereof, the lobes and sides of said starting portion merging and blending gradually with one another to provide a substantially smooth, gently relieved form free of sharp edges and projections, the root of said starting portion being substantially symmetrical in cross-section with the root of said one convolution of said body portion, the axial projection of the root of said starting portion being substantially cylindrical.

3. The screw defined in claim 1, wherein the load-bearing surfaces of said screw diverge with respect to its axis.

4. A self-locking screw having a continuous external generally helical male thread including a starting portion adjacent one end of said screw, a body portion, and a ramp portion between said starting and body portions, said thread continuing throughout each of said portions, a female member having an aperture and having a preformed continuous internal female thread mating with said male thread, the root of said starting portion being of reduced cross-section relative to the root of said body portion, the root of said body portion in each of a plurality of convolutions adjacent said ramp portion being of arcuate non-circular cross-section having a plurality of convex arcuately curved lobes and intermediate sides, in each of said plurality of convolutions said lobes being located farther outward from the axial center of said screw than said sides, said lobes and sides merging and blending gradually with one another to provide a substantially smooth, gently relieved form free of sharp edges and projections, the root of said ramp portion connecting the roots of said body portion and starting portion, said root of said ramp portion being of arcuate non-circular cross-section having a plurality of convex arcuately curved lobes and intermediate sides, said second-mentioned lobes being located progressivly farther outward from the axial center of said screw from said starting portion to said body portion to provide said root of said ramp portion with a generally radially outward taper from said starting portion to said body portion, said second-mentioned intermediate sides being radially inwardly relieved relative to the line of taper provided by said second-mentioned lobes, said second-mentioned lobes and sides merging and blending gradually with one another to provide a substantially smooth, gently relieved form free of sharp edges and projections, said root of said ramp portion being substantially symmetrical in cross-section with the root of said body portion in said plurality of convolutions adjacent said ramp portion, the crest of said female thread extending generally helically and having interference with at least some of said lobes but being relieved from said intermediate sides, said radially outermost lobe in said ramp portion being located substantially no farther outward from the axial center of said screw than said first-mentioned lobes, the root of said male thread being of substantial width measured axially to provide broad load-bearing surfaces, and a continuous space for receiving displaced metal between one of the flanks of said male thread and the confronting flank of said female thread, said male thread in said starting portion being substantially full-formed and of substantial height to assure proper starting in said female thread.

5. The structure defined in claim 4, wherein the root of said starting portion is of arcuate non-circular cross-section having convex arcuately curved lobes and intermediate sides, each of said lobes in said starting portion being located farther outward from the axial center of said screw than said intermediate sides of said starting portion, said lobes and sides of said starting portion merging and blending gradually with one another to provide a substantially smooth, gently relieved form free of sharp edges and projections, the root of said starting portion being substantially symmetrical in cross-section with the root of said body portion in said plurality of convolutions adjacent said ramp portion, the axial projection of the root of said starting portion being substantially cylindrical.

6. The structure defined in claim 4, wherein the root of said body portion in said plurality of convolutions, the root of said ramp portion, and the root of said starting portion are of arcuate triangular cross-section, and the crest of said male thread is spaced radially from the root of said female thread in the mating convolutions.

7. The structure defined in claim 4, wherein said load-bearing surfaces of said screw diverge from its axis at an angle of approximately 6° so that said load-bearing surfaces are axial load bearing.

8. The structure defined in claim 7, wherein the distance across the root of said screw in said plurality of convolutions measured through the center of said screw is substantially the same throughout 360°.

9. A self-locking screw having a continuous external generally helical male thread including a starting portion adjacent one end of said screw, a body portion, and a ramp portion between said starting and body portions, said thread continuing throughout each of said portions, a female member having a preformed continuous internal female thread mating with said male thread, the root of said starting portion being of reduced cross-section relative to the root of said body portion, the root of said body portion in at least one convolution adjacent said ramp portion being of arcuate non-circular cross-section having a plurality of convex arcuately curved lobes and intermediate sides, said lobes being located farther outward from the axial center of said screw than said sides, said lobes and sides merging and blending gradually with one another to provide a substantially smooth, gently relieved form free of sharp edges and projections, the root of said ramp portion connecting the roots of said body portion and starting portion and providing a generally radially outward taper from said starting portion to said body portion, said root of said ramp portion being of arcuate non-circular cross-section, said root of said ramp portion having a lobe adjacent the root of said body portion located farther outward from the axial center of said screw than the root surfaces on either side thereof and merging and blending gradually with the latter to provide a smooth, gently relieved form free of sharp edges and projections, the crest of said female thread extending generally helically and having interference with said lobes when said screw enters said female member but relieved from said sides, the root of said male thread being of substantial width measured axially to provide broad load-bearing surfaces, and a continuous space for receiving displaced metal between one of the flanks of said male thread and the confronting flank of said female thread, said male thread in said starting portion being substantially full-formed and of substantial height to assure proper starting in said female thread.

10. A self-locking screw having a continuous external generally helical male thread including a starting portion adjacent one end of said screw, a body portion, and a ramp portion between said starting and body portions, said thread continuing throughout each of said portions, the root of said starting portion being of reduced cross-section relative to the root of said body portion, the root of said body portion in at least one convolution adjacent said ramp portion being of arcuate non-circular cross-section having a plurality of convex arcuately curved lobes and intermediate sides, said lobes being located farther outward from the axial center of said screw than said sides, said lobes and sides merging and blending gradually with one another to provide a substantially smooth, gently relieved form free of sharp edges and projections, the root of said ramp portion connecting the roots of said body portion and starting portion and providing a generally radially outward taper from said starting portion to said body portion, said root of said ramp portion being of arcuate non-circular cross-section, said root of said ramp portion having a lobe adjacent the root of said body portion located farther outward from the axial center of said screw than the root surfaces on either side thereof and merging and blending gradually with the latter to provide a smooth, gently relieved form free of sharp edges and projections, the root of said thread being of substantial width measured axially to provide broad load-bearing surfaces, said thread in said starting portion being substantially full-formed and of substantial height to assure proper starting in a pre-tapped hole.

References Cited

UNITED STATES PATENTS

| 449,887 | 4/1891 | Rogers | 85—46 |
|---------|--------|--------|-------|
| 2,352,982 | 7/1944 | Tomalis | 151—22 |
| 2,437,638 | 3/1948 | Evans | 151—22 |
| 2,788,046 | 4/1957 | Rosan | 151—22 |
| 2,959,086 | 11/1960 | Gerlach et al. | 85—46 |
| 3,158,390 | 11/1964 | Woodling | 151—22 |
| 3,246,556 | 4/1966 | Phipard | 85—46 |
| 3,247,877 | 4/1966 | Evans | 151—22 |
| 3,249,142 | 5/1966 | Phipard | 151—22 |

FOREIGN PATENTS

| 757,763 | 9/1956 | Great Britain. |
| 112,116 | 9/1962 | Pakistan. |

CARL W. TOMLIN, Primary Examiner.

R. S. BRITTS, Assistant Examiner.